United States Patent
Siegel

(10) Patent No.: US 7,333,826 B2
(45) Date of Patent: Feb. 19, 2008

(54) VOICE HUB PROCESSING

(75) Inventor: Neil G. Siegel, Ranch Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 670 days.

(21) Appl. No.: 10/294,793

(22) Filed: Nov. 14, 2002

(65) Prior Publication Data

US 2004/0097235 A1    May 20, 2004

(51) Int. Cl.
*H04B 3/36*  (2006.01)
*H04B 7/15*  (2006.01)
*H04B 7/00*  (2006.01)
*H04Q 7/20*  (2006.01)

(52) U.S. Cl. .................... 455/518; 455/517; 455/520; 455/11.1; 455/7

(58) Field of Classification Search ............... 455/517, 455/518, 519, 520, 7, 11.1; 370/400–402, 370/432, 254–256, 338, 395.5
See application file for complete search history.

(56) References Cited

U.S. PATENT DOCUMENTS

| | | | |
|---|---|---|---|
| 4,578,815 A | | 3/1986 | Persinotti |
| 5,185,797 A | * | 2/1993 | Barrett et al. ............... 380/274 |
| 5,369,783 A | * | 11/1994 | Childress et al. ............. 455/17 |
| 5,423,061 A | * | 6/1995 | Fumarolo et al. ............ 455/519 |
| 5,530,703 A | | 6/1996 | Liu et al. |
| 6,111,860 A | | 8/2000 | Braun |
| 6,119,179 A | | 9/2000 | Whitridge et al. |
| 6,212,559 B1 | * | 4/2001 | Bixler et al. ................. 709/221 |
| 6,259,691 B1 | | 7/2001 | Naudus |
| 6,298,058 B1 | * | 10/2001 | Maher et al. ................ 370/390 |
| 6,298,062 B1 | | 10/2001 | Gardell et al. |
| 6,327,267 B1 | | 12/2001 | Valentine et al. |
| 6,330,316 B1 | | 12/2001 | Donak et al. |
| 6,445,777 B1 | * | 9/2002 | Clark ....................... 379/88.13 |
| 6,477,150 B1 | * | 11/2002 | Maggenti et al. ........... 370/312 |
| 6,603,965 B1 | * | 8/2003 | Dinkin ........................ 455/416 |
| 2003/0027525 A1 | * | 2/2003 | Moore et al. ................. 455/41 |
| 2004/0002351 A1 | * | 1/2004 | Upp et al. ................... 455/519 |

FOREIGN PATENT DOCUMENTS

WO    WO 0207455 A1 *    1/2002

OTHER PUBLICATIONS

International Preliminary Examination Report for PCT/US03/27271, filed Aug. 29, 2003, IPER completed Sep. 17, 2004.

\* cited by examiner

*Primary Examiner*—Charles N. Appiah
*Assistant Examiner*—Bryan Fox
(74) *Attorney, Agent, or Firm*—Tarolli, Sundheim, Covell & Tummino LLP

(57) ABSTRACT

Systems and methods are provided for routing voice communications to groups in a voice communication system using a voice hub system. The voice hub system allows a user to group communication devices into one or more logical networks and/or unit task organizations. The user can then select one or more of the communications groupings to transmit and receive voice communications. A user can change the communication grouping selections automatically changing the communication group that the voice hub system is transmitting and receiving voice messages.

23 Claims, 10 Drawing Sheets

VOICE HUB PROCESSING

CROSS-REFERENCE TO RELATED-APPLICATIONS

This application is related to commonly assigned application Ser. No. 10/295,274 filed Nov. 14, 2002, entitled "SECURE NETWORK-ROUTED VOICE MULTICAST DISSEMINATION", and application Ser. No. 10/295,744 filed Nov. 14, 2002, entitled "SECURE NETWORK-ROUTED VOICE PROCESSING" both of which are herein incorporated by reference.

TECHNICAL FIELD

The present invention relates to communications and, more particularly, to systems and methods for communicating with communication groups in a voice communication system.

BACKGROUND OF THE INVENTION

The use of communication systems having wireless mobile communication units has become widespread. Wireless communication systems provide several important advantages over conventional wired systems. For example, wireless communication users can communicate in locations where wired service is not available or feasible, such as remote or rugged locations. Additionally, wireless communication users have much more mobility because they do not have to connect to a fixed wired network. These and other favorable characteristics make wireless communications ideally suited for personal, business, military, search and rescue, law enforcement, and water vehicle applications.

Common approaches to providing wireless communication systems are two-way radio systems and cellular systems. Cellular systems require fixed based stations such as cell towers that are coupled to a wired network. These types of systems are not practical when the entire network needs to remain mobile. Typically, two-way radio systems contain their own self-contained infrastructure, such that all of the mobile communication units (e.g., radios, data terminals, voice/data terminals) within a network need to be programmed to similar frequencies or channels.

Despite the benefits of two-way radios, they have several drawbacks. First, two-way radios typically support only half-duplex operation, meaning that only one user can talk at a time. A user must push a "talk" button to talk to another user and if both users push their "talk" buttons at the same time, then the users cannot hear each other. The reason for this is that all participants transmit data on the same channel. Two-way radios also require that users agree upon and select a particular channel to use for a conversation. A user can only talk to others tuned to the same parameters (e.g., frequency, modulation type, cryptographic settings, frequency-hopping settings). Typically, this means that a user can only talk to others that have similar types of radio equipment. If the channel being used is lost, or cannot be used because of excessive interference, then the users must transfer to a different channel, which in practice can be difficult to do because even if an alternate channel has been previously agreed upon it is often difficult to create a reliable method for all parties to determine that the original channel is no longer available.

Two-way radio systems are often line-of-sight-type radio systems. Military line-of-sight-type radios are typically VHF (Very High Frequency) or UHF (Ultra High Frequency) radios that broadcast in frequencies from about 30 MHZ to 300 MHZ, and have effective ranges of about 5-25 miles, based on RF power, the antenna/mast height used with the radio, and other factors. These VHF/UHF radio types have limited range capabilities, but are used because these radio bands can be highly reliable. Other radio types can at times provide beyond-line-of-sight service, for example, HF (High Frequency) radios. HF radios broadcast in frequency ranges from about 1 MHZ to about 20 MHZ, and can at times achieve much longer ranges than VHF/UHF radios. However, the HF radio broadcasts are much less reliable than the VHF/UHF radio broadcasts.

Current line-of-sight voice communication systems are broadcast on dedicated networks. The radios are set in frequencies that operate only in the line-of-sight, as these provide high reliability within the line-of-sight constraints. These radio types are typically push-to-talk, half-duplex systems that allow a person to talk only to other radios that are operating within the same physical network. While highly reliable within these constraints, it is highly desirable to allow direct half-duplex voice communications to occur with different groups or organizations across different logical networks.

Additionally, in certain line-of-sight voice communication systems such as military line-of-sight voice communication systems, existing battlefield communications systems require a military user, that wants to talk to another military user over a battlefield voice communications system, to know in advance which media is appropriate to reach that user, and then for the originating user to take actions specific to that particular media, in order to establish a voice circuit. For example, a user may need to select and pick up a handset specific to that appropriate media, or set a switch to select the specific communications media, or a similar action. This imposes a significant knowledge burden on the originator of the voice call, in order to reach the intended recipient.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods for routing voice communications to groups of recipients (e.g., listeners, where each "group" can be designated as a single such listener, or a specific set of such listeners) in a voice communication system using a voice hub system. The voice hub system allows a user to group communication devices into one or more logical networks and/or unit task organizations. The user can then select one or more of the communications groupings to transmit and receive voice communications, for example, via a hand set. A user can change the communication grouping selections through a single button-push or menu-selection action, and thereby automatically change the group to which the voice hub system is transmitting.

In one aspect of the present invention, only the set of "listeners" specified by the group definition can hear the transmitted voice stream. Therefore, other users that are not members of the group, including those on the same network, cannot hear voice transmissions that are not directed to them. Additionally, a user can talk to other users without needing to know what type of radio other members are utilizing, what network they are tuned into, or any other technical information. A user can just select another user by name from a computer menu. One key aspect of the current invention is the ability to direct a voice message to a member without requiring the user to know any technical details regarding the communication.

In one aspect of the invention, the voice communication system is a mobile communication system having a plurality of members grouped as logical networks and/or unit task organizations. The voice communications are transmitted as digitized voice packets over radio frequency links. The digitized voice packets contain one or more destination group addresses. One or more routers (e.g., mobile routers) are provided in the system that receive the digitized voice packet and extract the routing information. The routing information is used in conjunction with a router database to determine which identified group to route the digitized voice packets. The one or more routers can be adapted to receive and route voice communications to and from different radio types, communication protocols (e.g., channels, frequency hopping schemes) and security protocols (e.g., encryption, decryption) across one or more logical networks.

The router database provides the one or more routers with information regarding groupings of logical networks, groupings of unit task organizations and connections of the mobile communication units with the routers. The router can receive configuration information from a configuration manager or the voice hub that defines the logical network groupings and unit task organizations. The router utilizes destination information (e.g., group identification) in digitized voice packets and the router database to transmit voice packets in multicast format. Administrative routines are executed to periodically update the router databases with respect to router connections of the one or more routers.

In one aspect of the invention, the mobile communication system is a two-way radio communication system having a plurality of half-duplex line-of-sight radio devices configured as one or more logical networks. At least one router is provided in the mobile communication system. The at least one router can be integrated into a two-way radio device or be a stand-alone router device. The router can be mobile such that the entire network and coverage area of the entire network is mobile. The router can be directly connected to one or more radio devices through different ports, so that the router can transmit multicast voice messages across radio devices of different logical networks. The router can be coupled to a voice hub system, such that the router routes voice messages to and from the voice hub system in addition to other radio devices in the communication system. In most aspects of the invention, computers, displays, software, and databases allow the user to specify to whom the user wishes to talk to by name, whether individual users, or groups of users that the user has defined.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

Figure 1:
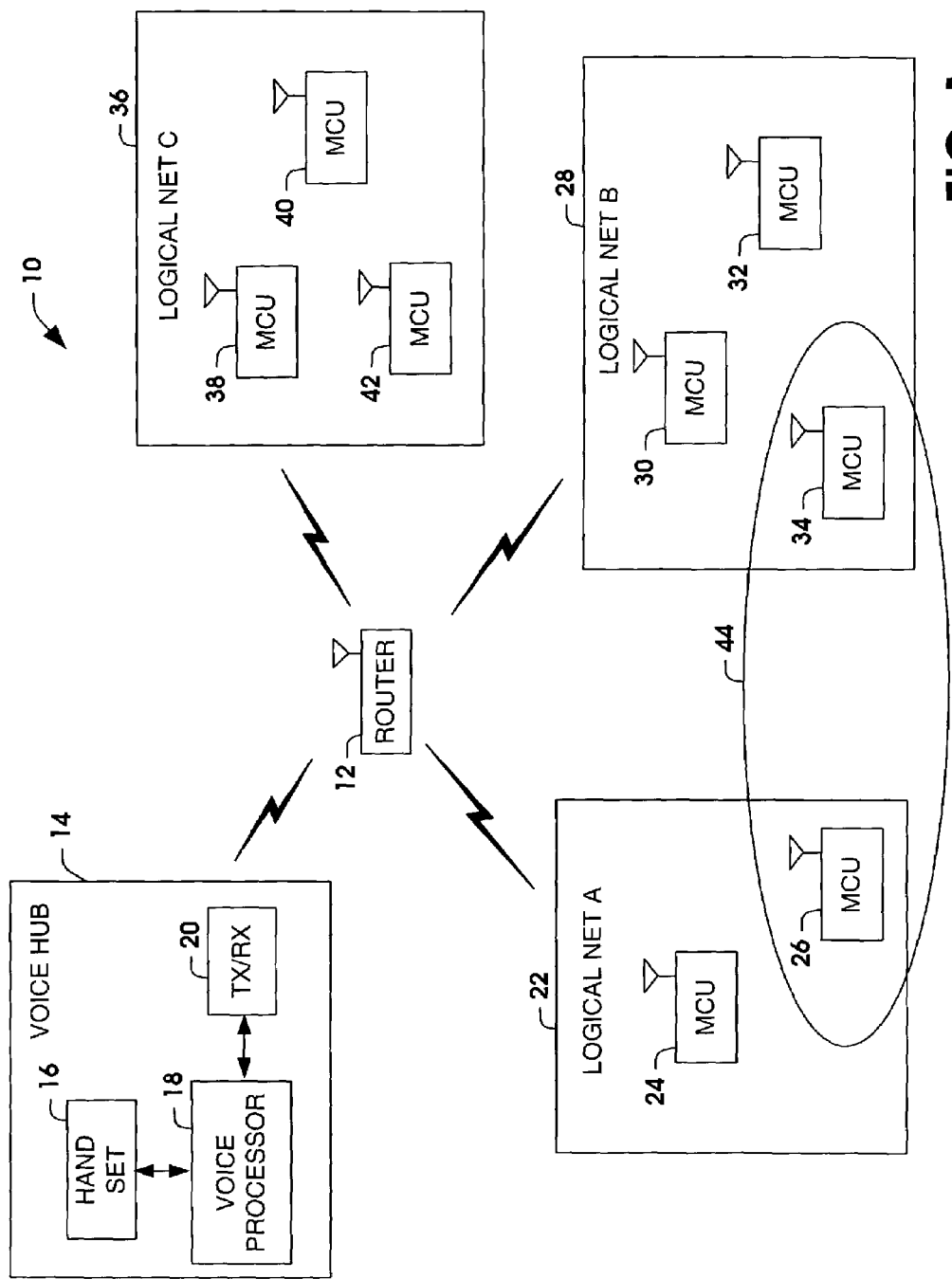
FIG. 1 illustrates a block diagram of a wireless communication system having a voice hub system in accordance with an aspect of the present invention.

The present invention relates to systems and methods for routing voice communications to groups in a voice communication system using a voice hub processor. The voice communication system can be a mobile communication system having a plurality of members grouped as logical networks and/or unit task organizations. A "unit" can be defined as a single entity in an organizational structure. The "unit task organization" is then the overall organization plan by which units are grouped and interrelated, according to the tasks they perform. The unit task organization can be a configured network, a team within a network or a team across a plurality of different networks.

In a military organization, units may include such entities as divisions, brigades, companies, fleets, ships, aircraft groups and so forth. Alternatively, a unit can be a group of artillery personnel residing in different divisions, brigades, companies, fleets, ships, aircraft groups within different communication networks. In a business context, units can include such entities as corporations, groups, sectors, divisions, branches, departments, and individuals with various job titles. Similarly, organizational units with other appropriate names are used in governmental and educational organizations.

The present invention relates to systems and methods for routing voice communications to groups of recipients (e.g., listeners, where each "group" can be designated as a single such listener, or a specific set of such listeners) in a voice communication system using a voice hub system. The voice hub system allows a user to group communication devices into one or more logical networks and/or unit task organizations. The user can then select one or more of the communications groupings to transmit and receive voice communications. The communication grouping selections can be selectable automatically changing the group to which the voice hub system is transmitting. For example, once a communication group is selected, only the set of "listeners" specified by the group definition can hear the transmitted voice stream. Therefore, other users that are not members of the group, including those on the same network, cannot hear voice transmissions that are not directed to them. Additionally, a user can talk to other users without needing to know what type of radio other members are utilizing, what network they are tuned into, or any other technical information. A user can just select another user by name from a computer menu. The user can direct a voice message to a member without requiring the user to know any technical details regarding the communication.

One or more routers (e.g., mobile routers) receive the digitized voice packets and extract routing information from the digitized voice packets. The routing information is used in conjunction with a router database to determine where to route the digitized voice packets. The one or more routers can be adapted to receive and route voice communications in a multicast transmission to and from members in different networks and using different communication protocols.

In one aspect of the invention, the present invention integrates available communications media so that the media is available through a single handset/headset, and more importantly, the communications media is under the control of a computer software application that manages a "phone dialer" software application that draws upon knowledge of the supported mobile communication units (e.g., military unit), and its existing communications media, links, networks, and users active on each in order to automatically select the optimal media to reach the desired user. The optimal media can be a voice intercom, wireless LAN, wired LAN, single-channel radios of various sorts, SATCOM, commercial telecommunications infrastructures, or a secure network-routed voice processing system. The result is that the user placing the call does not need to know which communications device or media is the one that will reach the intended recipient, because the voice hub computer and its software automate the process. In most aspects of the invention, computers, displays, software, and databases allow the user to specify to whom the user wishes to talk by name, whether individual users, or groups of users that the user has defined.

FIG. 1 illustrates a mobile voice communication system 10 utilizing a voice hub system 14 in accordance with an aspect of the present invention. The voice hub system 14 transmits voice messages through a router 12 to one or more mobile communication units. The voice hub system 14 provides a user with selectability between voice communications with different groups of mobile communication systems. For example, the plurality of mobile communication units can be grouped into one or more logical networks and/or unit task organizations. The voice hub system 14 can provide a user with selectability between communicating with one or more of those groups through a user interface or the like.

The voice hub system 14 includes a voice processor 18, which processes the user's group selection. For example, the voice processor 18 can invoke a routing connection list containing routing information for receiving and transmitting voice communications with the voice hub system 14. The routing connection list can reside in the voice hub system 14 or be transmitted to a router 12 as configuration information, such that the router 12 can transmit and receive voice messages between the voice hub system 14 and the selected group of mobile communication units. A hand set 16 is integrated into the voice hub system 14 and coupled to the voice processor 18. The hand set 16 includes a speaker for receiving voice messages and a microphone for transmitting voice messages. A user selects a particle communication group, and then can communicate with members of that group through the hand set 16. The voice messages are wirelessly transmitted between a transceiver 20 and the router 12. The router 12 routes the voice messages between the voice hub system 14 and the selected group of mobile communication units.

The present invention is particularly useful in mobile voice communication systems (e.g., two-way radio communication systems) since members are constantly moving and task organizations are constantly changing. However, it is to be appreciated that the present invention can be implemented in other voice communication systems having members that are disposed in fixed locations.

The mobile communication system 10 also includes a plurality of mobile communication units (MCUs) 24-26, 30-34, and 38-42 operative to communicate with the voice hub system 14 and one another wirelessly via respective antennas. The mobile communication units 24-26, 30-34, and 38-42 transmit voice messages from one unit to one or more (e.g., 1 to N) of the other mobile communication units, router 12 and the voice hub system 14. The voice hub system 14 and the mobile communication units 24-26, 30-34, and 38-42 can also transmit data information (e.g., administrative data, location data, configuration data, priority data). The mobile communication system 10 can be, for example, a two-way radio communication system (e.g., a plurality of half-duplex line-of-sight radio units) configured as a self-contained radio communication system, such that the system has a self-contained infrastructure. Therefore, the system does not include a fixed base station or wired network serving as a central server.

The mobile communication system 10 includes a plurality of mobile communication units configured as logical networks. A first logical network 22 includes mobile communication units 24 and 26. A second logical network 28 includes mobile communication units 30, 32 and 34. A third logical network 36 includes mobile communication units 38, 40 and 42. The router 12 is configured to allow voice communication to occur between mobile communication units within different networks, and between the voice hub system 14 and different groupings of mobile communication units.

For example, a voice message can be initiated at mobile communication unit 24 from logical network A. The voice message can be transmitted directly to the mobile communication unit 26 since both are members of the logical network A. Additionally, the router 12 can be configured to receive the voice message, and route the voice message to the mobile communication 30 in logical network B, and to the mobile communication units 38 in the logical network C, such that mobile communication units 24, 26 and 38 form a subnetwork or subteam. The router 12 can be preconfigured and/or configured by disseminating configuration information from the voice hub system 14 or a separate configuration manager.

In the present example of FIG. 1, a subteam or subnetwork 44 is formed from the mobile communication unit 26 in logical network A, and the mobile communication unit 34 in logical network B. A user at the voice hub system 14 selects the subteam or subnetwork 44 to begin transmission and receipt of voice messages. The voice processor 18 then transmits information that informs the router 12 of the selected communication grouping. The information can be contained in voice packets of the transmitted voice message. The voice processor 18 also formats the voice message in the appropriate communication format for transmission to both the mobile communication unit 26 and the mobile communication unit 34. For example, if the mobile communication unit 26 and the mobile communication unit 34 may require different communication configurations (e.g., protocols), the voice processor will store the different communication configurations and transmit the voice message in a multicast transmission. That is different copies of the voice message in different formats are stored in a buffer. The different copies are then transmitted consecutively, such that the mobile communication units receive the voice message in its particular desired format. Alternatively, the router 12 can be programmed to transmit the voice messages in a multicast transmission.

The router 12 can be mobile and move within the communication range of the system 10, such that the entire coverage range of the system 10 is mobile. The router 12 can route voice messages to the mobile communication units that cannot receive the voice messages directly (e.g., different logical networks, different radio types, different communication protocols). Alternatively, the router 12 can route all voice messages transmitted by one or more of the mobile communication units. The router 12 can also be programmed to route voice communications between mobile communication units that are of different radio types, different frequency hop-sets and different cryptographic variable sets.

It is to be appreciated that the mobile communication system 10 can include a plurality of routers. Additionally, each mobile communication unit can include an integrated built-in router to facilitate routing of voice messages to members of a selected group. The routers can be dynamically updated to determine when a new member (e.g., mobile communication unit, router) enters the system 10. The respective router is then provided with information related to parameters (e.g., radio type, frequency hop-set, cryptographic variable set, network, subnetwork address, group membership) associated with the new member.

In one aspect of the invention, a speech pattern or voice message is provided to the hand set 16 of the voice hub system 14, which is then amplified and converted into digitized voice data. The digitized voice data can be in the form of digitized voice packets, such as Voice Over Internet Protocol (VOIP) packets, Network Voice Protocol (NVP) packets or any other form of digitized voice or digitized speech data. Identification information is provided in the digitized voice packets, for example, in a header of the digitized voice packets. The header can contain data type, data source, data destinations, data security and data priority information. The packets can be transmitted and addressed to multiple mobile communications units within different network addresses, subnet addresses and/or subteam addresses. The packets are then converted to an analog voice signal to be transmitted over the air via a radio frequency link. The analog voice signal can be modulated and transmitted over the air as modulated radio transmission waves or electromagnetic waves.

The router 12 can employ a router database to determine who is connected to the destination units, and how to send the voice data to particular mobile communication units and/or the voice hub system 14. For example, the router database can provide information regarding the particular mobile communication units within the range of the router, the radio type, and the logical network and/or unit task organization groupings which the mobile communication unit resides. The routers 12 can then employ this information to route the voice data to one or more of the respective mobile communication units. A mobile communication unit can be a member of one or more networks, subnets and/or subteams.

Figure 2:
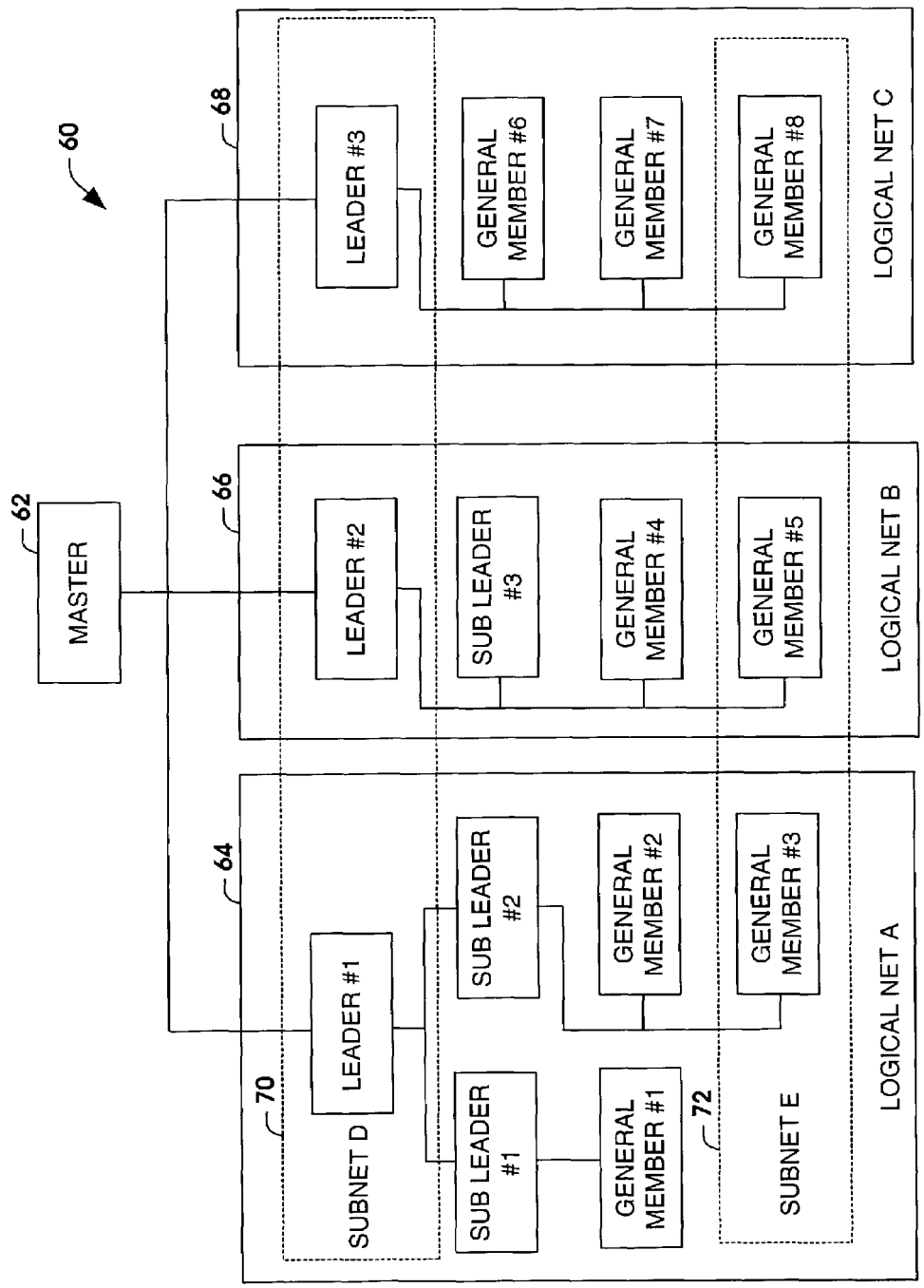
FIG. 2 illustrates an organization chart representing members of an organization.

FIG. 2 illustrates an organization chart 60 representing members of an organization. The organization chart 60 has been grouped into a plurality of communication groupings representing different unit task organizations. The organization includes a master unit 62 who can communicate to any or all of the unit task organizations. A first unit task organization 64 is grouped into a logical network A. The first unit task organization includes leader #1, subleader #1, subleader #2, general member #1, general member #2 and general member #3. A second unit task organization 66 is grouped into a logical network B. The second unit task organization 66 includes leader #2, subleader #3, general member #4, and general member #5. A third unit task organization 68 is grouped into a logical network C. The third unit task organization 68 includes leader #3, general member #6, general member #7 and general member #8.

A fourth unit task organization 70 is formed of leader #1, leader #2, and leader #3. The fourth unit task organization 70 is grouped into a communication grouping of all leaders across the different logical networks A, B, C, forming subnet or subteam D. A fifth unit task organization 72 is formed of general member #3, general member #5 and general member #8. The fifth unit task organization 72 is grouped into a communication grouping of general members across the different logical networks A, B, C, forming subnet or subteam E. The present invention allows for grouping and voice communications to occur across the different logical networks, such that different subnets or subteams can be formed.

For example, communication grouping of all the leaders can be important when the leaders are different military battalions, companies or platoons that need to communicate with one another directly. Additionally, the master unit 62 can be brigade commander who wants to speak to the subordinate commanders before commencement of an operation, such as subnet D. The brigade commander may want to speak with all artillery personal such as formed from a communication groupings of general members of subnet E.

Communication grouping of all the leaders can be important when the leaders are different business divisions, departments or groups that need to communicate with one another directly. The master unit 62 can be a chief financial officer who wants to speak to all of the vice presidents of the company. The chief financial officer may want to speak with all finance or accounting personnel such as formed from a communication grouping of general members of subnet E.

One or more routers are provided that allow voice communications to be transmitted across the logical networks A, B, C. Therefore, the routers provide a mechanism for communications to occur within or to different unit task organizations of a substantially larger organization. Each member in the organization can then be provided a communication unit that transmits voice messages that can be routed to one or more destination units based on the communication groupings. The routers can be preprogrammed prior to placement in the field and/or periodically programmed by a configuration manager.

Figure 3:
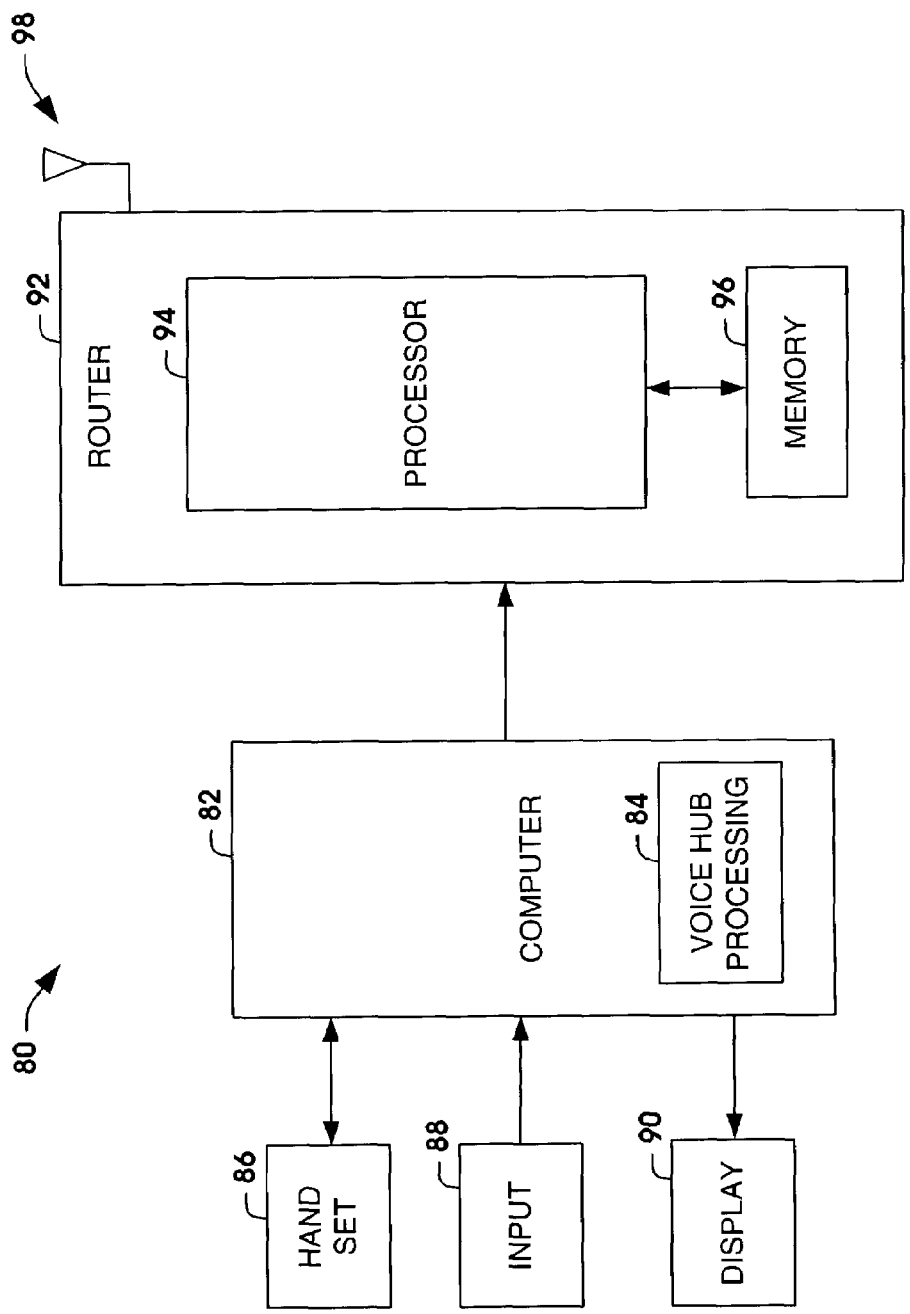
FIG. 3 illustrates a block diagram of a voice hub system having a wireless router in accordance with an aspect of the present invention.

FIG. 3 illustrates a block diagram of a voice hub system 80 utilizing a wireless router 92 in accordance with an aspect of the present invention. The voice hub system 80 includes a computer 82 coupled to the router 92, for example, via a LAN connection. The computer 82 includes a voice hub processing module 84 formed of one or more components.

The components can be software, hardware or a combination of hardware and software. The voice hub processing module 84 allows a user to group and/or select voice communication units into one or more communication groups, such as logical networks and/or unit task organizations. The user can then select a particular grouping, which allows a user to transmit and receive voice communications with the selected group. The selection can cause configuration information to be transmitted to the router 92. Alternatively, the router 92 can be pre-configured and the selection information provided in the voice messages. For example, group information can reside at the router 92, and the router 92 can use group identification numbers in the voice messages and the group information to determine where and how to route the voice messages.

A hand set 86 is coupled to the computer for voice communications to and from the voice hub 80. The user can then send and receive voice communications to and from the selected communication group using the hand set 86. An input device 88 is coupled to the computer 82. The input device 88 allows a user to provide input information to generate and select between the communication groups. A display 90 is coupled to the computer that provides the user with a user interface to allow the user to group voice communication devices and/or select from different voice communication groups.

The router 92 can be programmed to route the voice data in the form of digitized packets using address information contained in the digitized packets. The router 92 can convert the digitized voice packets into analog signal for transmission over an antenna 98. The router 92 can transmit the voice message to different networks using a particular modulation scheme, frequency-hopping scheme, security scheme and communication protocol understandable by those in the respective network. Destination voice communication devices or units can receive the voice communication from the router 92 or other voice communication devices in its respective network. The destination voice communication units can convert the voice communication into digitized packets. The digitized packets can then be transformed back into the voice message and played over the destination voice communication units.

In one aspect of the invention, the voice communication devices are half-duplex radios. Each radio can be operative to communicate with a different set of radios in a wireless network. The different set of radios can be configured to operate as subnets, logical networks and/or unit task organizations. The computer 82 can process the selected group and transmit information about the selected group to the router 92. For example, configuration information can be provided from the computer to the router 92. The router 92 can generate a router database from the configuration information defining routing connections for one or more logical networks and/or unit task organizations. The selected group information can then be provided in the voice messages, which the router 92 can extract. Alternatively, source information can reside in the voice message, and the router can use the knowledge the router has on the grouping membership to determine where to route the message. The router 92 can use the information in the router database and the voice information to route the messages to the appropriate destinations. Therefore, communication from the hand set 86 can be transmitted to the router 92, which determines routing information within voice messages to route the voice message to radios within the selected group.

The router 92 includes a processor 94 coupled to a memory device 96. The memory device 96 provides the processor 94 with appropriate algorithms to route voice messages between the voice hub system 80 and one or more logical networks and/or task organizations. The processor 92 can be programmed to decrypt and/or decipher voice data in one protocol from a first voice communication device, and provide a separate encryption and protocol to the voice data to send to a second voice communication device and/or the voice hub system 80. The processor 94 can also extract routing information from the voice data, and transmit the voice data to a second router system or directly to specific voice communication devices in a desired subnet. Voice packets can be queued in the memory device 96 for multicast transmission for transmitting in different communication protocols to multiple subnets.

Figure 4:
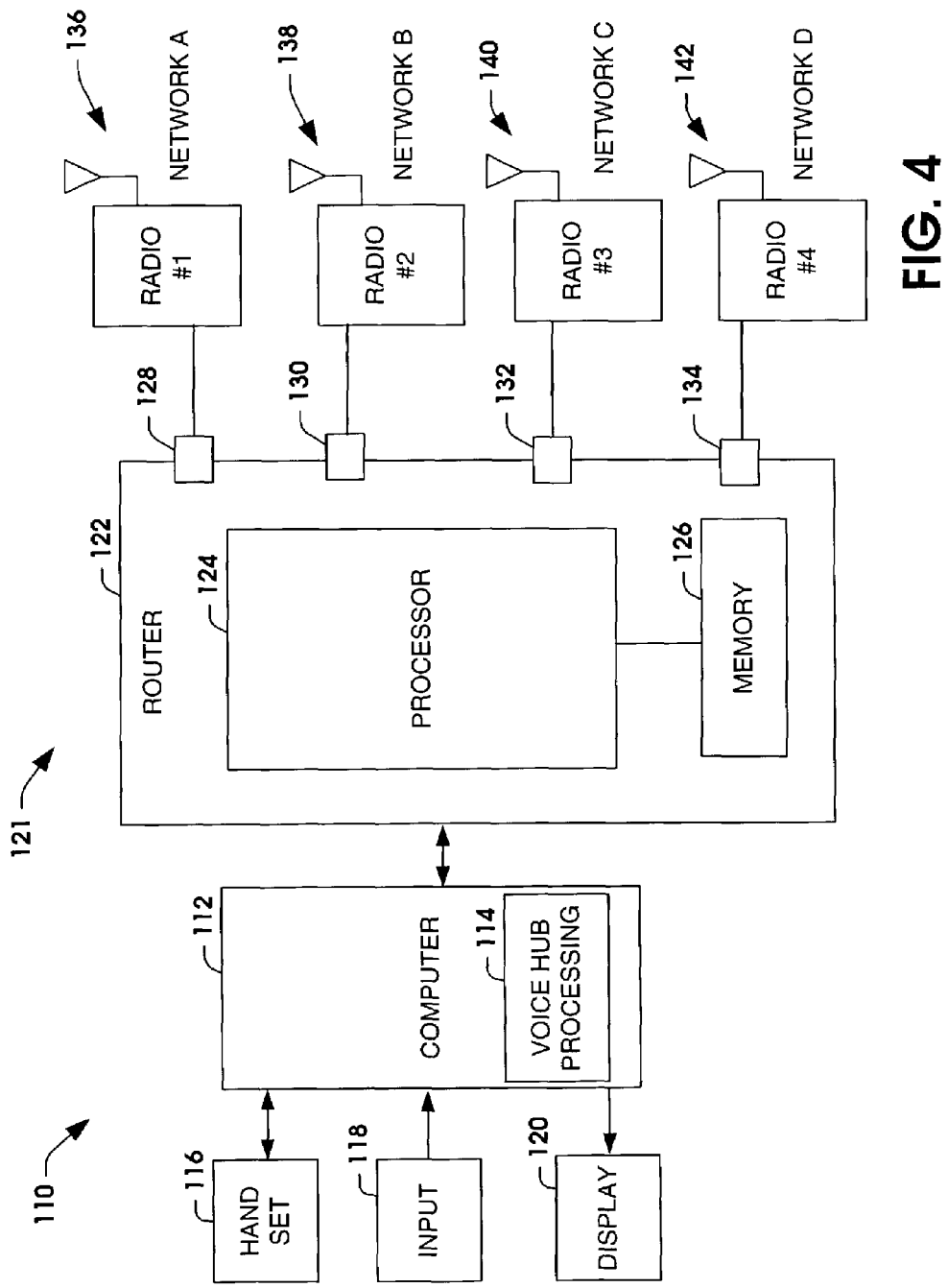
FIG. 4 illustrates a block diagram of a voice hub system using a router system in accordance with an aspect of the present invention.

FIG. 4 illustrates a block diagram of a voice hub system 110 utilizing a router system 121 in accordance with an aspect of the present invention. The voice hub system 110 includes a computer 112 coupled to the router system 121, for example, via a LAN connection. The computer 112 includes a voice hub processing module 114. The voice hub processing module 114 allows a user to group voice communication units into one or more communication groups, such as logical networks and/or unit task organizations. The user can then select a particular communication group, which allows a user to transmit and receive voice communications with the selected communication group. The selection can cause configuration information to be transmitted to the router system 121. Alternatively, the router system 121 can be pre-configured and the selection provided in the voice messages, such that group information is already provided to the router, and the router uses group identification numbers and/or source information to determine where and how to route the voice messages.

A hand set 116 is coupled to the computer 112 for voice communications to and from the voice hub system 110. The user can then send and receive voice communications to and from one or more selected communication groups. An input device 118 is coupled to the computer 112. The input device 118 allows a user to provide input information to generate communication groupings and select between the communication groups. A display 120 is coupled to the computer 112 that provides the user with a user interface to allow the user to group voice communication devices and/or select from different voice communication groups.

The router system 121 includes a router 122 coupled to a first radio 136 through a first port 128, a second radio 138 through a second port 130, a third radio 140 through a third port 132 and a fourth radio 142 through a fourth port 134. The first port 128, the second port 130, the third port 132 and the fourth port 134 can be different port types. For example, the ports can be any of RS-232 ports, RS-422 ports, RS-485 ports, USB ports, parallel ports, IEEE standard ports and LAN connections. The first radio 136, the second radio 138, the third radio 140 and the fourth radio 142 can be radios of different types, communicating with different frequency hopping schemes, different encryption schemes, different modulation schemes using different protocols over different networks.

For example, the first radio 136 is configured to communicate within logical network A, the second radio 138 is configured to communicate within logical network B, the third radio 140 is configured to communicate within logical network C, and the fourth radio 142 is configured to communicate within logical network D. The router 122 can be programmed to receive voice communications from radio devices within a first network, and transmit that voice communications to radio devices in one or more of the other networks. For example, a voice communication can be received by the first radio 136 from a member in network A. The voice communication can be converted into digitized packets containing address source and destination information. The router can employ a router database to determine the desired destinations of the voice communications across one or more of the other networks (e.g., network B, network C, network D).

The router 122 includes a processor 124 coupled to a memory device 126. The memory device 126 provides the processor 124 with appropriate algorithms to route voice messages from one radio network and/or subnet to one or more other radio networks and/or subnets. For example, the processor 124 can be programmed to decrypt and/or decipher voice data in one protocol from a first radio type, and provide a separate encryption and protocol to the voice data to send through a second radio type. The processor 124 can also extract routing information from the voice data and transmit the voice data to a second router system or directly to specific radios in a desired subnet. Voice packets can be queued in the memory device 126 for multicast transmission across multiple networks.

The router 122 can be programmed to route the voice data in the form of digitized packets using the address information. The radios can be adapted to convert the digitized voice packets into analog signal for transmission over their respective networks using a particular radio type, modulation scheme, frequency hopping scheme, security scheme and communication protocol understandable by those in the respective network. The destination radios can then receive the voice communication from radios in their respective networks and convert the voice communication into digitized packets understandable by the respective radio. The digitized packets can then be transformed back into the voice message and played over the destination radios.

Figure 5:
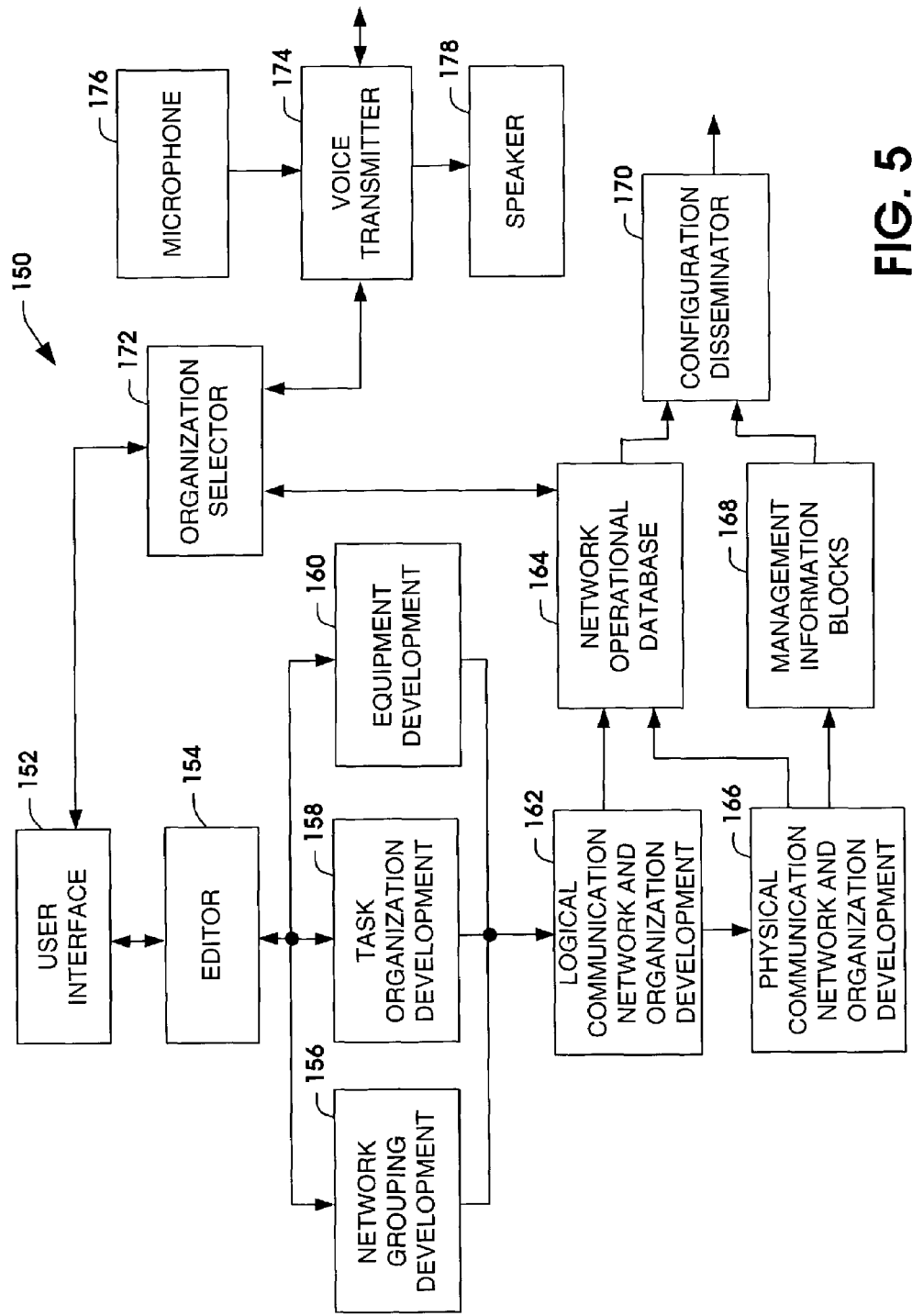
FIG. 5 illustrates a functional block diagram of a voice processing system in accordance with an aspect of the present invention.

FIG. 5 illustrates a functional block diagram of a voice hub processing system 150 in accordance with an aspect of the present invention. The voice hub processing system 150 allows a user to setup select communication groups (e.g., logical networks, unit task organizations) of voice communications devices (e.g., two-way radio devices), and set up a phone dialer system, so that a user can automatically select between one or more groups for communicating voice messages. The system 150 includes a user interface 152 coupled to an editor 154 that allows a user to define unit task organizations and logical networks. The unit task organizations can be a logical network or a subnetwork having members across one or more logical networks. The function of the user interface 152 and the editor 154 is to permit an authorized user to make configuration changes, additions to the logical communication networks and task organizations, and equipment parameters of members in the communication system.

The system 150 includes a network grouping development module 156 coupled to the editor 154. The network grouping development module 156 allows a user to define new networks and assign members to those networks. The network development module 156 also allows a user to modify logical networks among entities that will be using the network or networks being configured. The system 150 includes a task organization development module 158. The task organization development module 158 allows a user to define or modify organizational relationships among entities that will be using the network being configured.

The system 150 also includes an equipment development module 160 coupled to the user interface 152 via the editor 154. The equipment development module 160 can provide information relating to the communication equipment such as radio type, router type, communication protocol, frequency hop-set, and cryptographic variable set. The equipment development module 150 also establishes a relationship between each communication unit and the platform on which it functions. The platform can be further defined by platform identification, platform type, equipment set identification, equipment elements and the type of unit, such as router, host, radio. The term "platform" can be used to define the working environment of a communication device. The "platform" data may pertain to a vehicle, such as an automobile, an armored tank, a ship or an aircraft. For example, a router can reside on a jeep that travels along with the entire mobile communication unit such that the router becomes mobile. Data about the jeep would then be considered platform data.

The system 150 then provides the network grouping information, the task organization information and the equipment information to a logical communication network and organization development module 162. The logical communication network and organization development module 162 converts the logical networks and organizations developed to physical networks and organizations using a physical communication network and organization development module 166.

The physical communication network and organization development module 166 uses all input data pertaining to the network, the desired logical networks, and task organizations to derive corresponding physical network and organization parameters. Data defining both the logical and physical networks and organizations are combined to form a network operational database 164. The physical communication network and organization development module 166 also generates a set of management information blocks 168. The management information blocks 168 contain data for reconfiguring members in the mobile communication system in accordance with a new configuration.

The network operational database 164 and the management information blocks 168 are provided to a configuration disseminator 170. The configuration disseminator 170 transmits the configuration information including data from the network operational database and management information blocks to the routers. Transmission can be made in a standard format, such as the simple network management protocol (SNMP). SNMP is designed to facilitate monitoring of network bridges and routers, but the same protocol can be used in the present invention to control and program bridges and/or routers in accordance with a new configuration.

The system 150 also includes an organization selector 172 coupled to the user interface 152. The organization selector 172 allows a user to select between one or more groupings of logical networks and/or task unit organizations to communicate with over a voice transmitter 174. A microphone 176 is coupled to the voice transmitter 174 which converts audible sounds into electrical signals. A speaker 178 is coupled to the voice transmitter 174 for converting electrical signals into audible sounds. The user can change groups automatically by selecting a new group on the user interface 152.

Figure 6:
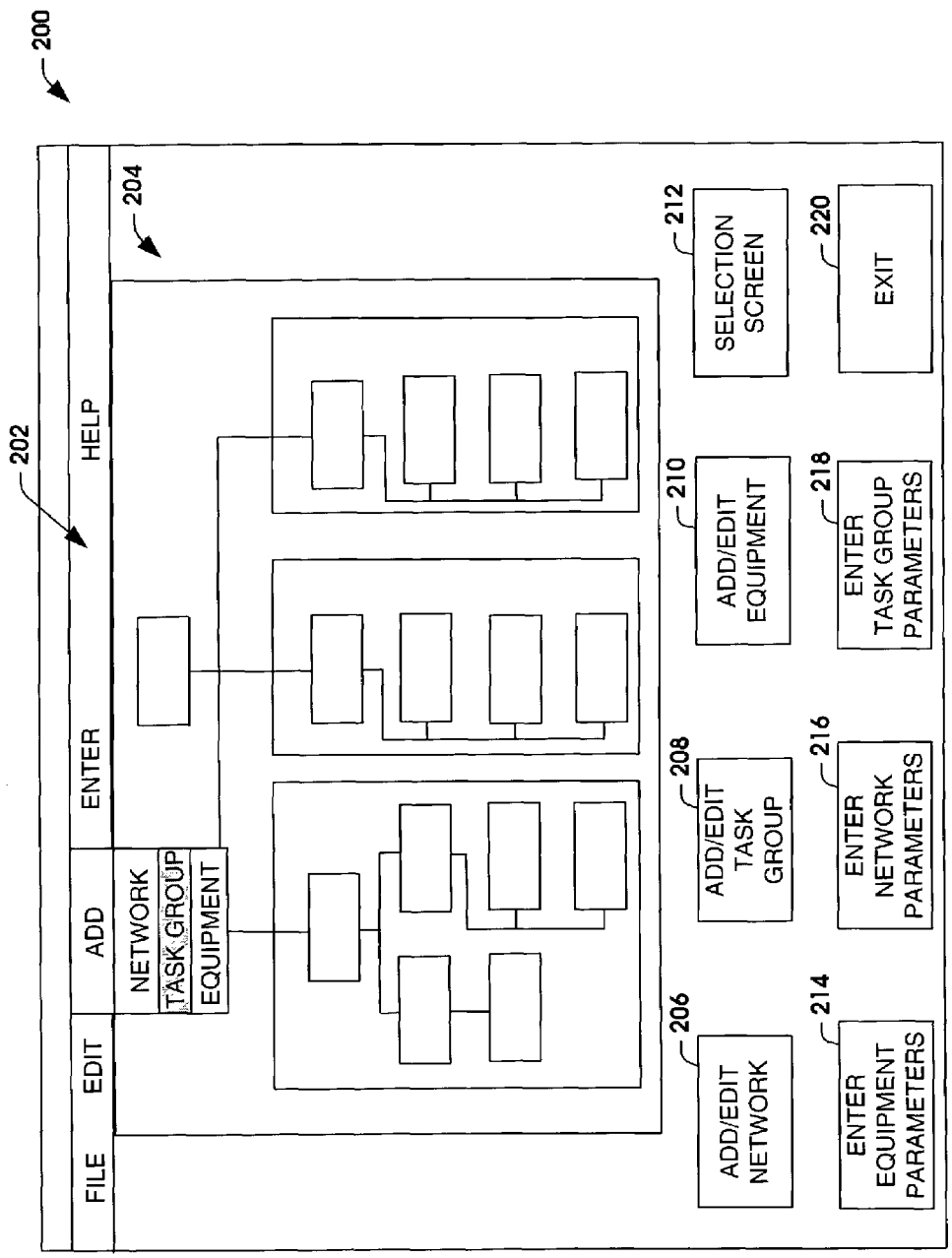
FIG. 6 illustrates an example of a possible user interface for grouping logical networks and unit task organizations in accordance with an aspect of the present invention.

FIG. 6 illustrates an example of a possible graphical user interface (GUI) 200 for grouping voice communication units in accordance with an aspect of the present invention. The GUI 200 includes a tool bar menu 202, an organizational chart image 204 and a plurality of command buttons. The GUI 200 allows the user to define logical networks, new task organization units and to move existing logical networks and task organization units to new positions using a familiar "drag-and-drop" operation with a mouse or similar pointing device. Configurations that are contrary to logical network and unit task rules and restrictions are not permitted, and appropriate error messages are communicated to the user through the GUI 200.

The tool bar 202 includes pull down menus labeled as "FILE", "EDIT", "ADD", "ENTER" and "HELP". A user can load an organizational chart template from the "FILE" pull down menu, and then add/edit/delete members, group members as logical networks and/or task groups in addition to adding, defining and editing equipment definitions of members. A standard "HELP" menu is provided for assisting the users with the GUI 200.

The plurality of command buttons include an "ADD/EDIT NETWORK" button 206 that allows a user to add a logical network or edit an existing logical network. For example, the user can drag and drop members on the GUI 200, and click on the "ADD/EDIT NETWORK" button 206 to create a new logical network. Alternatively, the user can click on an existing network to modify or delete that network by clicking on the "ADD/EDIT NETWORK" button 206. Other menus (not shown) can be provided to customize the creation and/or editing of a logical network. The GUI 200 also includes an "ADD/EDIT TASK GROUP" button 208 for adding and/or editing task groups, and an "ADD/EDIT EQUIPMENT" button 210 for adding or editing equipment.

The command buttons also include an "ENTER EQUIPMENT PARAMETERS" button 214, an "ENTER NETWORK PARAMETERS" button 216, and an "ENTER TASK GROUP PARAMETERS" button 218. The buttons 214, 216 and 218 allow a user to enter certain parametric information about the networks, the task groups and the equipment employed in the communication system. An "EXIT" button is provided that allows the user to exit the graphical user interface. A "SELECTION SCREEN" button 212 allows a user to move to a group selection screen (e.g., a phone dialer screen) once all of the desired groups have been created. The group selection screen allows a user to select a particle group for communicating voice messages. The same functionality provided by the command buttons can also be implemented through the tool bar 202.

Figure 7:
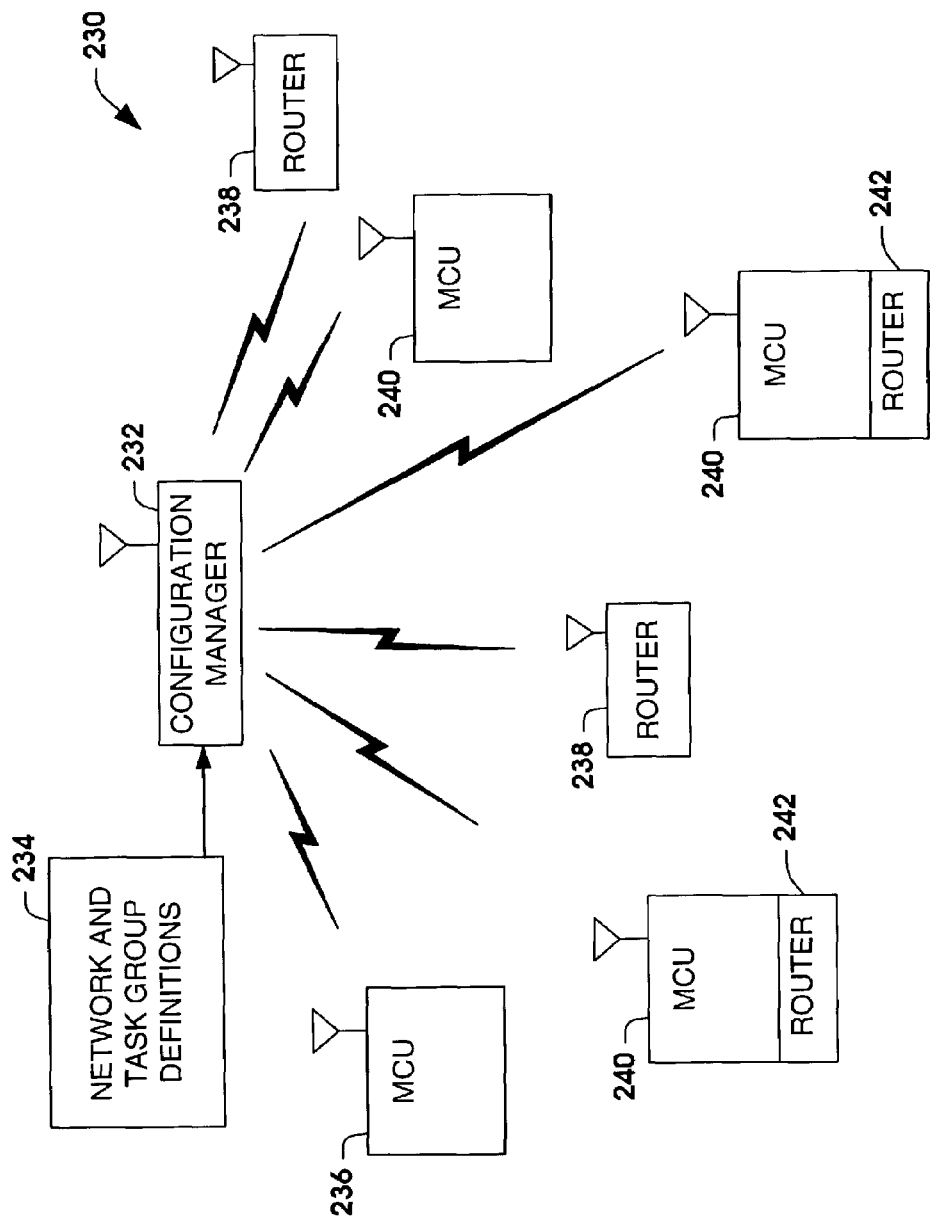
FIG. 7 illustrates a block diagram of a wireless communication system having a configuration manager in accordance with an aspect of the present invention.

FIG. 7 illustrates a mobile communication system 230 utilizing a configuration manager 232 that disseminates configuration information in accordance with an aspect of the present invention. The configuration manager 232 utilizes a network and task group definitions component 234 to program one or more routers in the mobile communications system 230 using similar functionality as illustrated in FIG. 5. The network and task group definitions component 234 define the network groupings and unit task organization groupings of the mobile communication system 230. The configuration manager 232 transmits this information to routers 238 and 242 and the routers 238 and 242 generate a respective router database defining group routing connection lists that are used to transmit voice messages to grouped communication units.

The mobile communication system 230 includes a plurality of mobile communication units (MCU) 236 and 240 operative to transmit voice signals wirelessly via respective antennas. The mobile communication units 236 and 240 can also transmit data information (e.g., administrative data, location data, configuration data, priority data). The mobile communication system 230 can be, for example, a two-way radio communication system configured as a self-contained radio communication system, such that the system has a self-contained infrastructure.

The mobile communication system 230 includes a plurality of mobile communication units 240 having built-in routers 242, a plurality of stand-alone mobile communication units 236 and a plurality of stand-alone routers 238. The configuration manager 232 programs the routers to facilitate routing of voice messages between groupings of mobile communication units defined as unit task organizations and/or logical networks. The configuration manager 232 transmits configuration messages to the routers periodically. The configuration messages contain information defining the network groupings and unit task organization groupings. The definition of the network groupings and unit task organization groupings can include, for example, network member identifiers, the physical location of the members, the relationship between the physical and logical addresses and the interconnection path between the members.

The physical address is a unique numerical or other code that uniquely defines the member (e.g., mobile communication unit, router, voice hub system) and the local network to which it is connected. The logical address is usually a name or label associated with the member or the person using it. The logical address, which may include a person's name, is the address other users employ to direct messages to the person without having to remember or look up a long and complicated physical address. The configuration messages also contain information relating to member types (e.g., radio types, router types), communication characteristics (e.g., different frequency hop-sets), member security information (e.g., cryptographic variable sets), member and task priority information, network parameters, equipment parameters, unit task organization parameters and configuration timing information.

Once configured, the routers 238 and 242 are programmed to create a respective router database or member group connection list, and employ the router database or member connection list in routing voice messages between groupings of mobile communication units, a voice hub system and/or other routers. Additionally, a voice hub system can be configured as a mobile communication unit forming part of a logical network and/or unit task organization, such that communication with the voice hub system appears to be to another mobile communication unit. The configuration manager 232 can be integrated into the voice hub system that acts a central command center for communicating and/or constantly rearranging member groupings as logical networks, subnetworks and/or unit task organizations.

The router database can include members connectable by the router and/or routers in the mobile communication system. Additionally, the routers 238 and 242 are programmed to perform administration updates (e.g., a dynamic routing protocol) based on movement of members and location of the member with respect to the routers 238 and 242. The administrative updates can be transmitted between the routers 238 and 242, such that the routers 238 and 242 can update their respective router databases.

The routers 238 and 242 can also determine optimal transmission paths to route the voice message to desired receivers, for example, through other routers and/or mobile communication units. The optimal transmission paths can be provided using statistical modeling, decision modeling, bayesian modeling or other decision techniques. The routers optimal path can be based on one or more parameters (e.g., time, priority, router location, mobile communication unit location, bandwidth, load sharing).

Figure 8:
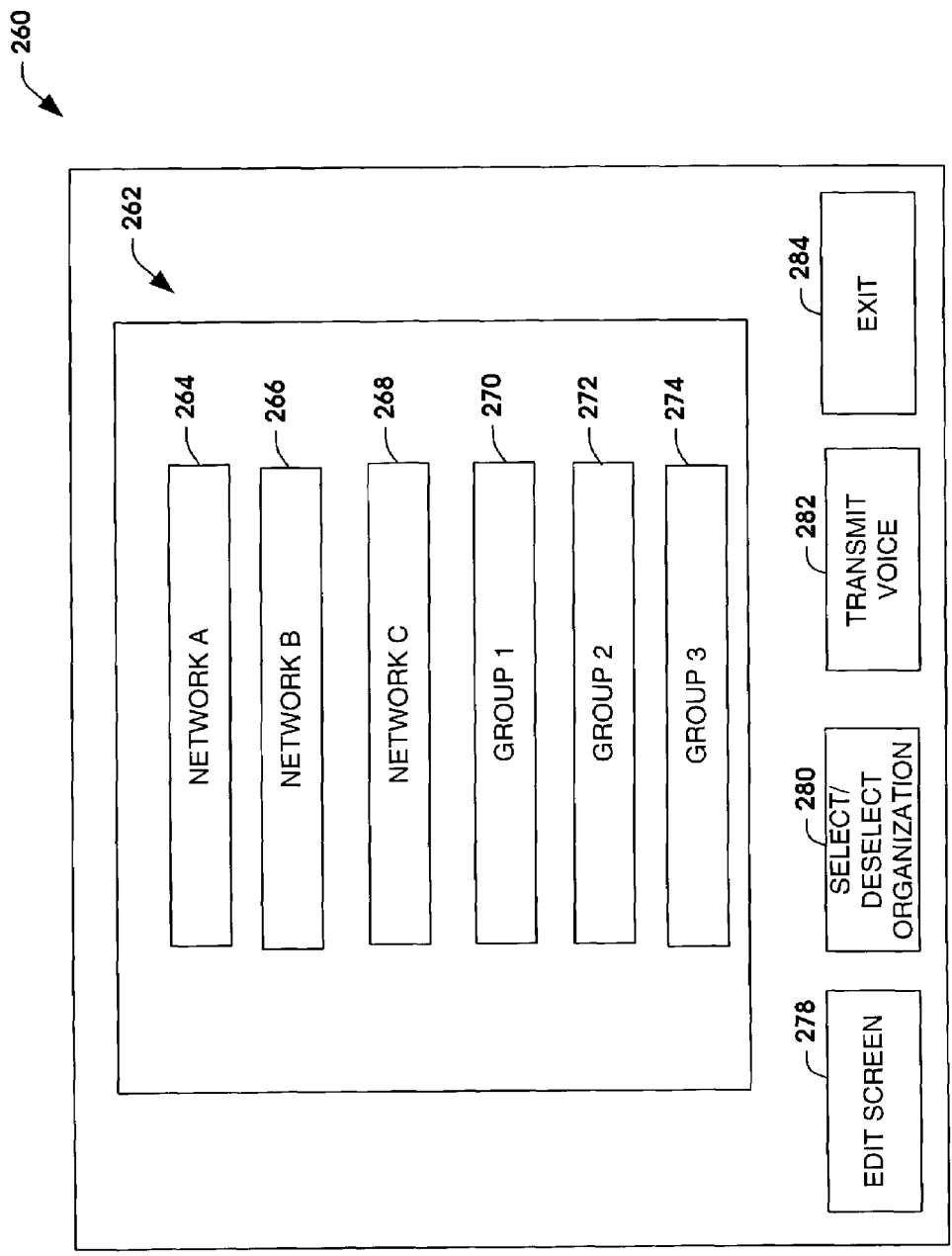
FIG. 8 illustrates a communication group selection screen in accordance with an aspect of the present invention.

FIG. 8 illustrates a group selection interface screen 260 in accordance with an aspect of the present invention. The group selection interface screen 260 forms part of a phone dialer system, such that a user can select between one or more groups to exchange voice communications. The user can automatically change, add and/or remove communication groups using the group selection interface screen 260. The group selection interface screen 260 includes a graphical display list of selectable communication groups 262. The communication group selections are comprised of groupings of voice communication unit into logical networks and/or unit task organizations. The list of communication group selections 262 include a "NETWORK A" selection 264, a "NETWORK B" selection 266, a "NETWORK C" selection 268, a "GROUP 1" selection 270, a "GROUP 2" selection 272 and a "GROUP 3" selection 274.

A user can select to communicate voice messages with one or more of the selection groups by selecting a group, for example, with a computer pointer, and then clicking on a "SELECT/DESELECT ORGANIZATION" button 280. The user can repeat the selection process until all the desired groups have been selected. The user can remove the communication group by unselecting the group and clicking on the "SELECT/DESELECT ORGANIZATION" button 280. Once all the desired groups have been selected, the user can begin voice communications by selecting a "TRANSMIT VOICE" button 282. A user can add, delete or modify a communication group by selecting the "EDIT SCREEN" button 278, which will provide the user with an edit screen such as the one illustrated in FIG. 6. A user can exit the selection screen 260 by selecting an "EXIT" button 284.

Figure 9:
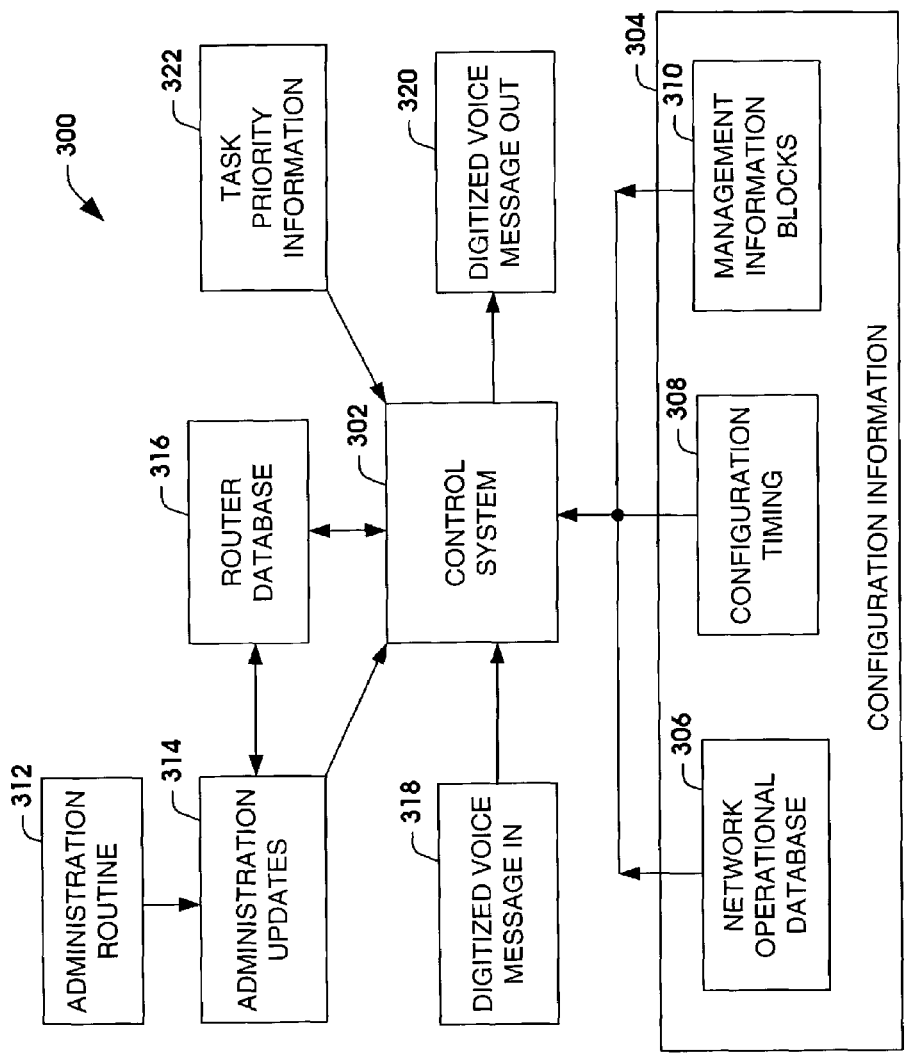
FIG. 9 illustrates a functional block diagram of a router in accordance with an aspect of the present invention.

FIG. 9 illustrates a functional block diagram of a router 300 in accordance with an aspect of the present invention. The router 300 includes a control system 302 that receives digitized voice input messages addressed to one or more mobile communication units, logical networks and/or unit task organization groups. The router 300 provides digitized voice output messages that can contain additional routing information to assure that the voice data reaches the appropriate mobile communication units. The control system 302 receives configuration information 304 from a configuration manager or disseminator. The configuration information 304 includes a network operational database 306, a configuration timing component 308 and a set of management information blocks 310.

The network operation database 306 defines the members of the logical networks and/or members of the unit task organizations, priorities and initial network and organization connections. The configuration timing component 308 informs the router 300 when it is time to switch over to the new configuration, for example, at a predetermined time via a trigger signal or immediately upon receiving the new configuration information. The management information blocks 310 contain data for reconfiguring the router 300 in accordance with the new configuration.

The control system 302 utilizes the configuration information in creating an initial router database 316 and a task priority information set 322. The router database 316 includes information relating to routing connections to the mobile communication units within network groupings and/or unit task organization groupings, and communication parameters associated with the mobile communication units. An administration routine 312 periodically executes to determine which mobile communication units and routers are within the communication range of the router 300, and provides administration updates 312 based on the determination. The administrative updates 314 also include the routing connection lists of other routers, such that optimal transmission paths can be determined for transmitting voice messages to members outside the router 300. The administrative updates 312 are provided to the router database 316 to continuously update the router 300 with information relating to members within the communication range of the router 300.

The control system 302 extracts routing information from the digitized voice input message 318 addressed to one or more mobile communication units. For example, the routing information can include information relating to the sender of the voice message, a group member list for which the voice message is intended and expected optimal paths determined by the sender. The control system 302 then determines if the desired voice message is for any device coupled to the router 300, and removes the device from the member list and provides the message in the form of digitized voice data to the coupled device. The control system 302 then determines if any of the optimal paths have changed and reconfigures the changed optimal paths. The control system 302 then reconfigures the routing information in the digitized voice message in 318, and provides the new routing information and member list in the digitized voice message out 320. The digitized voice message out 320 can then be transferred to members on the member list and additional routers if necessary. Alternatively, the voice message can be transmitted in multicast format to different members in a selected group.

Figure 10:
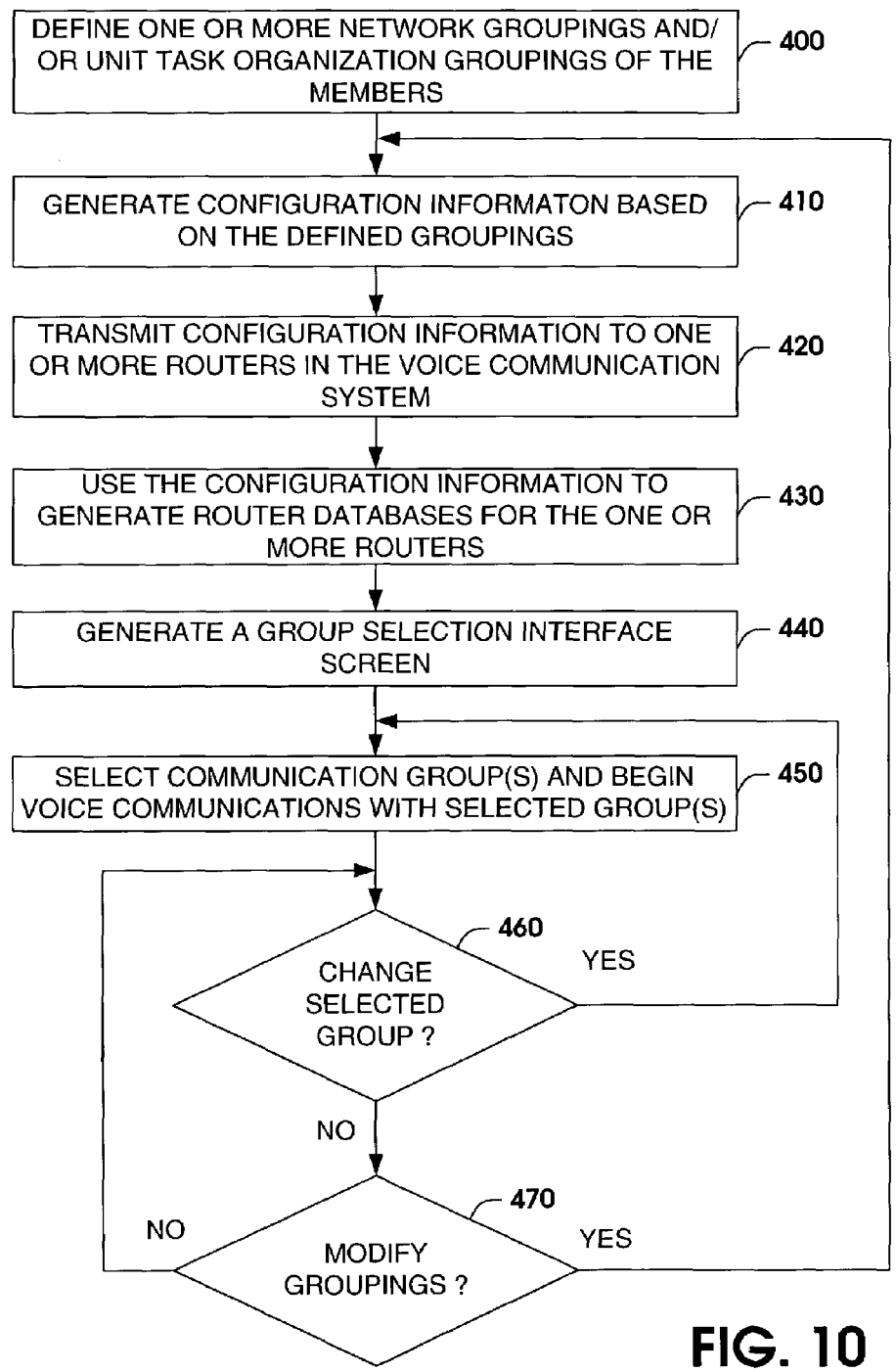
FIG. 10 illustrates a flow diagram of a methodology for transmitting voice messages to one or more communication groups in accordance with an aspect of the present invention.

In view of the foregoing structural and functional features described above, methodology in accordance with various aspects of the present invention will be better appreciated with reference to FIG. 10. While, for purposes of simplicity of explanation, the methodology of FIG. 10 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 10 illustrates a methodology for transmitting voice messages to one or more communication groups in a voice communication system in accordance with an aspect of the present invention. The voice communication system can be a wireless network having plurality of half-duplex two-way radio devices and one or more routers configured to provide multicast transmissions to radio devices grouped as networks and/or unit task organizations. The radio devices can be operative to transmit voice messages that are digitized during processing and routed by the radios and routers. The devices can be grouped as logical networks and/or unit task organizations, and one or more groups selected for communicating voice messages with the one or more groups using a voice hub system.

The methodology being at 400 where one or more network groupings and/or unit task organization groupings of members are defined. For example, one or more networks can be defined by grouping voice communication units into logical networks. The voice communication units can also be grouped into unit task organizations across one or more logical networks. The methodology then proceeds to 410.

At 410, configuration information is generated based on the defined groupings. The configuration information can include operational database information defining the network groupings, unit task organization groupings, member physical and logical address information, member communication parameters and member connection information. The information can also include router information, physical and logical address information about the routers, and any other information relating to the routers. The information can include the member type parameters (e.g., radio types), member communication parameters (e.g., channels, frequency hopping parameters), member security parameters (e.g., encryption parameters, decryption parameters), configuration timing and task and member priority information.

In one aspect of the invention, the configuration information includes a network operational database defining the members of the network, priorities, groupings and initial grouping connections, configuration timing information informs the routers when it is time to switch over to the new configuration and a set of management information blocks. The management information blocks contain data for reconfiguring members in the network in accordance with the new configuration.

At 420, the configuration information is transmitted to one or more routers in the voice communication system. The transmission can be made using SNMP or the like. At 430, the routers use the configuration information to generate respective router databases for the one or more routers. The methodology then proceeds to 440. At 440, a group selection interface is generated that allows a user to select between voice communications with one or more of the defined groupings. The methodology then proceeds to 450. At 450, a user selects between one or more communication groups to begin transmitting and receiving voice communications. The methodology then proceeds to 460.

At 460, the methodology determines whether a user has changed the selected group(s). If the user has changed the selected group(s) (YES), the methodology returns to 450 to begin voice communication with the newly selected groups. If the user has not changed the selected group(s) (NO), the methodology proceeds to 470. At 470, the methodology determines whether a user has modified the communication groupings. If the user has changed the communication groupings (YES), the methodology returns to 410 to generate new configuration information. If the user has not changed the communication groupings (NO), the methodology returns to 460 to determine if the selected group has changed. Voice communications continue with the selected communication group or groups, until a change in the selected group or a modification of the communication groupings occurs.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

The invention claimed is:

1. A wireless voice communication system comprising:
   a plurality of mobile communication units that wirelessly transmit voice messages;
   a voice hub system operative to group mobile communication units into a plurality of communication groups, the voice hub system comprising an editor that allows a user of the voice hub system to define logical network groups and assign which individual mobile communication units of the plurality of communication units are to be members of a given logical network group, the editor further allowing a user to define unit task organizations and to select individual mobile communication units from more than one logical network group as members of a given unit task organization, wherein the logical network groups and unit task organizations form the plurality of communication groups, the voice hub system being operative to provide selectability of voice message communications with at least one selected communication group of the plurality of communication groups; and
   a router that routes the voice messages between the voice hub system and the at least one selected communication group wherein the voice hub system automatically disseminates configuration information to the router, upon completion of the communication groupings, to allow automatic voice message communications between the voice hub system and the at least one selected communication group upon completion of a communication group selection.

2. The system of claim 1, the plurality of mobile communication units being a plurality of two-way line-of-sight radio devices.

3. The system of claim 1, at least one of the plurality of communication groups having radios of a different radio type having different frequency hopping schemes.

4. The system of claim 1, the voice message being transmitted to only members in the at least one selected communication group.

5. The system of claim 1, the plurality of communication groups being at least one unit task organization group and at least one logical network group.

6. The system of claim 5, wherein the unit task organization group includes selected individual members from at least two different logical network groups, such that the selected individual members from a given logical network group is less than a number of members forming the logical network group.

7. The system of claim 1, wherein voice messages transmitted to members in the at least one communication group being across different logical network groupings are automatically configured into different communication protocols based on different communication formats associated with the different logical network groupings.

8. The system of claim 1, further comprising a voice hub processing system that disseminates configuration information to the router, the configuration information defining logical network groups and unit task organization groups, the router utilizing the configuration information to create a router database defining communication requirements and routing connections for routing the voice messages.

9. The system of claim 8, the voice hub processing system provides logical network groupings and task organization groupings and converts the logical network groupings and task organization groupings to physical network groupings and task organization groupings.

10. The system of claim 9, the voice hub processing system provides a network operational database and a set of management information blocks using the physical network groupings and task organization groupings, the network operational database defining logical network grouping connections and task organization grouping connections and the management information blocks having data for reconfiguring the router.

11. The system of claim 1, the voice hub system further comprising an organization selector that selects between at least one communication group with which to communicate voice messages over a voice transmitter.

12. The system of claim 1, the voice hub system further comprising a graphical user interface coupled to the editor that allows a user to group members into logical networks and unit task organizations and provides information to the voice hub system relating to the groupings, the voice hub system stores the groupings in a database.

13. The system of claim 12, the voice hub system further comprising a second graphical user interface that allows a user to select between the plurality of communication groups from a menu for voice communication between the voice hub system and the selected communication group, the voice hub system providing switchability between the graphical user interface for grouping mobile communication units into communication groups and the second graphical user interface for selecting a communication group for voice communication.

14. A voice hub system for providing voice communication with communication groups of a two-way radio system, comprising:
- a voice hub processing module operative to group two-way radio devices into a plurality of communication groups, the voice hub system comprising an editor that allows a user of the voice hub system to define logical network groups and assign which individual mobile communication units of the plurality of communication units are to be members of a given logical network group, the editor further allowing a user to define unit task organizations and to select individual mobile communication units from more than one logical network group as members of a given unit task organization, wherein the logical network groups and unit task organizations form the plurality of communication groups, the voice hub system being operative to provide selectability of at least one of the plurality of communication groups for voice communications;
- a hand set coupled to a voice transmitter that transmits and receives voice communications from the voice hub system and at least one selected communication group of the plurality of communication groups; and
- a router that contains a router database defining routing connections with the plurality of communication groups, the router having a routing algorithm that extracts routing information from the voice communications and utilizes the extracted routing information and router database to route the voice communications between the voice hub system and the two-way radio devices of the at least one selected communication group, wherein the router database is configured in response to configuration information provided to the router by the voice hub processing module based on the groupings of the plurality of communication groups.

15. The system of claim 14, the plurality of two-way radio devices being a plurality of half-duplex line-of-sight two-way radio devices.

16. The system of claim 14, the voice hub processing module comprising an algorithm embodied on a computer-readable media.

17. The system of claim 14, the router having a plurality of different ports that provide connections to different two-way radio communication links trough different two-way radio, devices, the different two-way radio devices being members of different logical networks.

18. The system of claim 14, the router being a wireless router that routes voice communications between the voice hub system and radio devices across different logical networks.

19. The system of claim 14, the plurality of communication groups being at lest one unit task organization and at least one logical network group.

20. The system of claim 14, further comprising a first graphical user interface that allows a user to group members into logical networks and unit task organizations and disseminate configuration information associated with the groupings to the router, and a second user interface that allows a user to select between the plurality of communication groups for voice communication between the voice hub system and the selected communication group, wherein functionality is provided to allow a user to select between the first graphical interface and the second graphical interface.

21. The system of claim 14, wherein the router utilizes configuration information to create the router database that defines communication requirements and routing connections for routing the voice messages, the configuration information comprising a network operational database defining logical network grouping connections and task organization grouping connections and management information blocks having data for reconfiguring the router.

22. The system of claim 14, the router having an algorithm that receives configuration information and generates a router database defining logical network groupings, unit task organization groupings, and router connections to two-way radio devices in the system, the router using the router database with information in the voice communication to route the voice communications.

23. The system of claim 14, the voice communications being converted to digitized voice packers during routing, the digitized voice packets being one of Voice Over Internet Protocol packets and Network Voice Protocol packets.

* * * * *